United States Patent [19]

Whipple, Jr.

[11] Patent Number: 4,788,415

[45] Date of Patent: Nov. 29, 1988

[54] DUAL BIMETAL POWER CONTROL SWITCHING ARRANGEMENT FOR ELECTRONICALLY CONTROLLED APPLIANCES

[75] Inventor: Robert Z. Whipple, Jr., Prospect, Ky.

[73] Assignee: General Electric Company, Louisville, Ky.

[21] Appl. No.: 122,329

[22] Filed: Nov. 18, 1987

[51] Int. Cl.⁴ .............................................. H05B 1/02
[52] U.S. Cl. ................................... 219/508; 219/494; 219/483; 219/512; 219/510; 361/8; 361/13
[58] Field of Search ............... 219/486, 483, 491, 494, 219/497, 501, 506, 508, 512, 509, 510, 451–453; 307/117; 361/8, 13, 5, 6, 34

[56] References Cited

U.S. PATENT DOCUMENTS

| | | | |
|---|---|---|---|
| 3,555,353 | 1/1971 | Casson | 361/13 |
| 3,783,305 | 1/1974 | Lefferts | 361/8 |
| 3,798,416 | 3/1974 | Brouneus | 219/505 |
| 4,493,980 | 1/1985 | Payne et al. | 219/450 |

Primary Examiner—M. H. Paschall
Attorney, Agent, or Firm—H. Neil Houser; Radford M. Reams

[57] ABSTRACT

A power control switching arrangement for controlling energization of a load in response to an external controller, in which a first semiconductor switch is connected in parallel with the series combination of a first normally open thermally actuated switch and a second normally closed thermally actuated switch, to couple the power signal to the load. A first heater for the first thermal switch is connected in parallel with the load. A second heater for the second thermal switch is connected in series with a second semiconductor switch, across the power supply. The second semiconductor switch, when switched into conduction by the controller, enables energization of the second heater. To energize the load, the controller switches the first semiconductor switch into conduction enabling energization of the load and the first heater. Energization of the first heater closes the first thermally actuated switch, thereby shunting the first semiconductor switch. To de-energize the load, the controller switches the second semiconductor switch into conduction, enabling energization of the second heater. This opens the second thermally actuated switch de-energizing the load and the first heater. De-energization of the first heater enables the first thermally actuated switch to return to its normally open state.

4 Claims, 2 Drawing Sheets

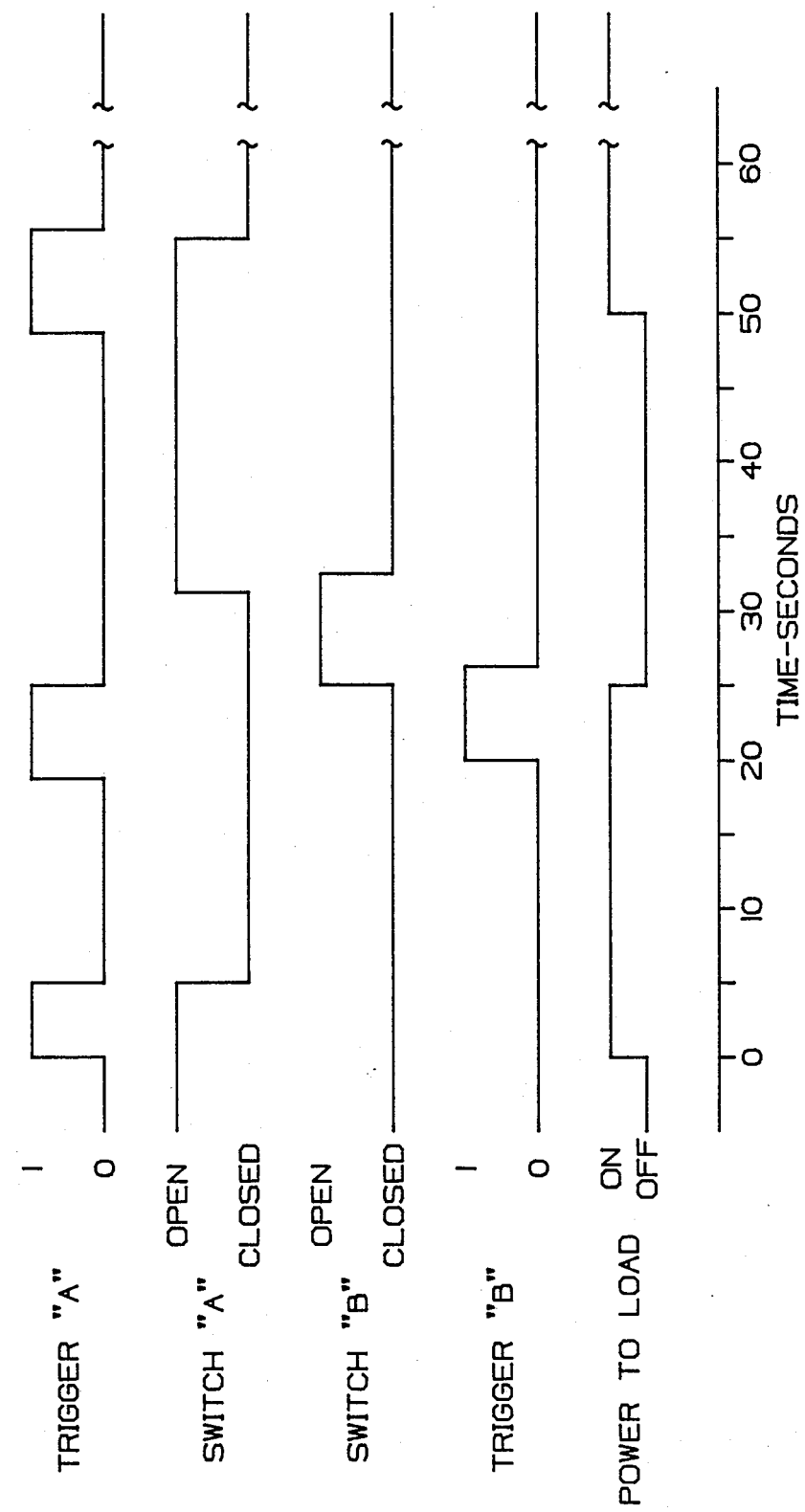

DUAL BIMETAL POWER CONTROL SWITCHING ARRANGEMENT FOR ELECTRONICALLY CONTROLLED APPLIANCES

BACKGROUND OF THE INVENTION

This invention relates generally to power control switching arrangements and particularly to switching arrangements for controlling power to heating units in electric ranges and cooktops in response to trigger signals from an electronic controller.

In electronically controlled ranges and cooktops of the type disclosed in commonly assigned U.S. Pat. No. 4,493,980 the electro-mechanical temperature sensing devices are replaced with electronic temperature sensing and control arrangements. In such arrangements an electronic controller, typically a custom programmed microprocessor, monitors the temperature information from a thermistor type sensor in the surface unit. Power switching is performed by a power control triac serially connecting the surface unit heating element to the household AC power supply. The electronic controller generates trigger signals for the triac as appropriate to achieve and maintain the desired temperature condition.

Triacs for power switching are used at least in part because power switching relays are also costly and have relatively limited longevity due to arcing problems in the contacts. However, the power control triac must carry high currents under normal operating conditions requiring large, bulky and costly heat sink structure to dissipate the heat generated in the triac. In one approach considered to relieve the large heat sink requirement, a relatively inexpensive relay rated only for conduction rather than power switching is used to shunt the power control triac during the ON cycles. The relay is closed, shunting the triac after the triac is triggered into conduction, thereby limiting the voltage developed across the relay during closure to a level insufficient to support arcing across the contacts. Once the relay is closed and conducting, the triac's trigger signal is removed and the triac remains non-conductive. To terminate the ON period, the triac is once again triggered into conduction, then the relay is opened and the triac trigger signal is removed. By limiting the conduction period of the triac to relative short times, this arrangement eliminates the need for a large heat sink for the triac. However, it also has certain drawbacks. To be cost effective, a relatively inexpensive relay must be used. Such relays tend to be noisy and have a relatively short useful life. Typically a cost effective relay would have a life expectancy of approximately one million switching cycles. For the type of control environment envisioned for an electronic control package for a cooktoop or range a life expectancy on the order of 4-5 million switching cycles is the goal.

Therefore, there is a need for a power control switching arrangement for use in electronic controls for cooktop surface units and particularly automatic surface units which is more cost effective than the triac/heat sink combination and which overcomes the aforementioned shortcomings of the relay/triac combination.

It is therefore a primary object of the present invention to provide a power control switching arrangement which retains the noise and longevity advantages of semiconductor switching, while eliminating the need for a large heat sink for the power control triac.

It is a further object of the present invention to provide a power control arrangement of the aforementioned type which provides for a switching cycle lifetime greater than that of a low cost conductive relay, quieter operation than a relay circuit, and which may be assembled in a smaller package.

SUMMARY OF THE INVENTION

In accordance with the present invention a power control switching arrangement is provided for selectively coupling the power signal from an external power supply to an electrical load such as a surace unit heating element in a cooking appliance in response to trigger signals from an external controller. The power control switching arrangement comprises a first semiconductor switch means for coupling the power signal from the external supply to the load, which is switched into conduction by a trigger signal applied to its gate terminal from the external controller. A first thermally actuated switch means operative to switch when heated from a normally open state to a closed state and a second thermally actuated switch means operative to switch when heated from a normally closed state to an open state are serially electrically connected to each other and in parallel circuit with the first semiconductor switch means to shunt the first semiconductor switch means when each of the thermal switch means is in its closed state. A first heater means for heating the first thermally actuated switch means is electrically connected in parallel circuit with the load. A second heater means for heating the second thermally actuated switch means is electrically connected in series circuit with a second semiconductor switch means. This series combination is electrically connected across the power supply. The second semiconductor switch means is switched into conduction to enable energization of said second heater means by a trigger signal from the controller applied to its gate terminal.

By this arrangement the application of a trigger signal at the gate of the first semiconductor switch means enables energization of the load and energization of the first heater means. Energization of the first heater means causes the first thermally actuated switch means to switch from its normally open state to its closed state, thereby shunting the first semiconductor switch means, at which time the load is energized through the first and second thermally actuated switch means and current is removed from the first semiconductor switch means. To de-energize the load, a trigger signal is applied to the gate terminal of the second semiconductor switch means, enabling energization of the second heater means. Energization of the second heater means causes the second thermally actuated switch means to switch from its normally closed state to its open state, thereby de-energizing the load and de-energizing the first heater means. De-energization of the first heater means enables the first thermally actuated switch means to return to its normally open state. To prevent arcing when turning off the load, a trigger signal is also applied to the gate terminal of the first semiconductor switch means, switching it into conduction until the second thermally actuated switch means has switched to its open state.

In a preferred form of the invention each first and second thermally actuated switch means comprise bimetal switch members and the first and second heater means each comprise a resistive heating element positioned when energized to heat its corresponding bimetal switch member.

BRIEF DESCRIPTION OF THE DRAWINGS

While the novel features of the invention are set forth with particularity in the appended claims, the invention both as to organization and content will be better understood and appreciated from the following detailed description taken in conjunction with the drawings in which:

FIG. 3 is a state diagram illustrating the switching sequence of the circuit arrangement of FIG. 2.

DETAILED DESCRIPTION

Figure 1:
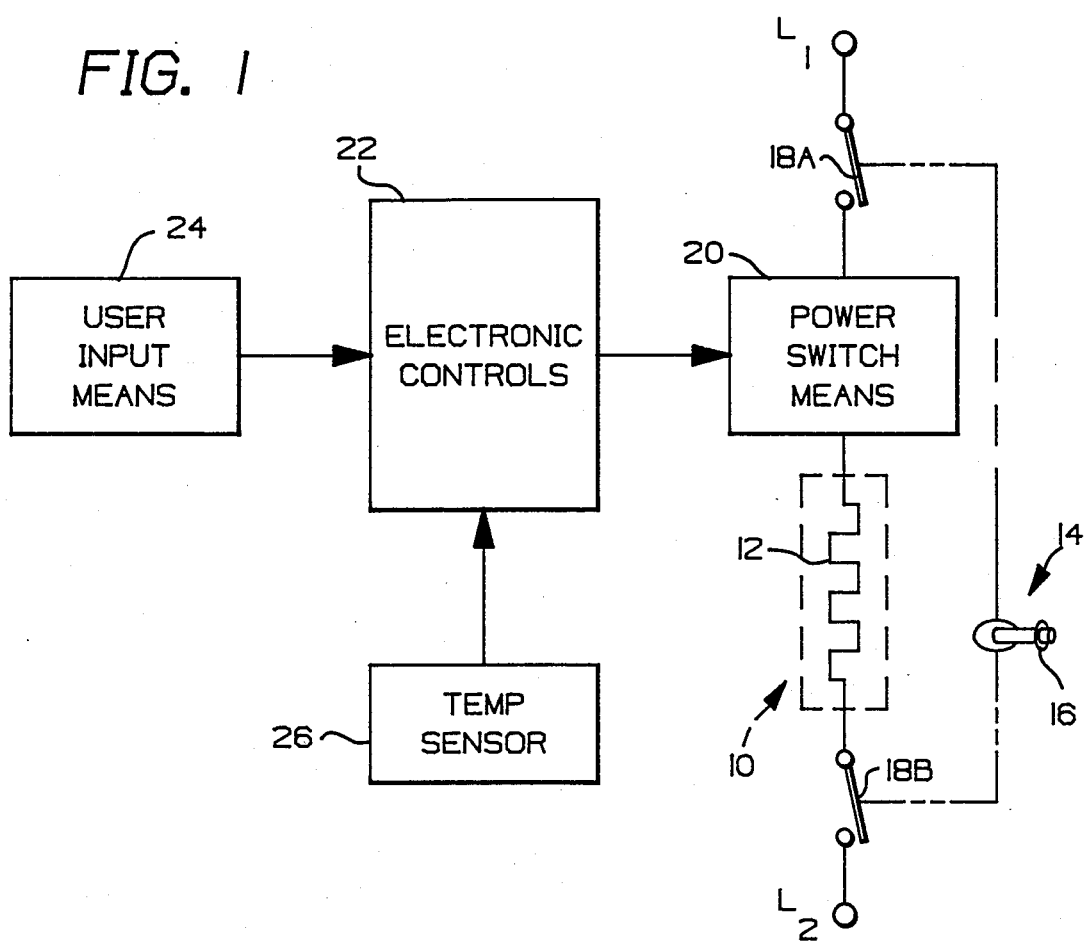
FIG. 1 is a simplified functional block diagram of a power control circuit for an automatic surface unit incorporating an illustrative embodiment of the switching arrangement of the present invention.

Referring now to the generalized functional block diagram of FIG. 1, an automatic surface unit 10 of the type used in a cooktop or range comprises a heating element 12 energized by standard 60 Hz AC power signal which can be either 120 or 240 volts as is typically available at power outlets in residential homes supplied to terminals L1 and L2. This surface unit is turned on and off by a main power switch designated generally 14 comprising user actuable control knob 16, cam-member 17 and a pair of cam-actuated switch contacts 18A and 18B. Cam-member 17 is mechanically connected to control knob 16 for movement in concert therewith. Contacts 18A and 18B are switched from open to closed in tandem by cam-member 17 in response to the rotation of control knob 16 from its OFF to its ON position. With switch 14 in its ON position, power is cycled to element 12 via switch means 20 connected in series with element 12. Switch means 20 is switched into and out of conduction by control signals generated by electronic controller 22.

Electronic controller 22 generates power control signals in response to inputs from the manually operable input selection means 24 by which the user selects the desired temperature level for the operation of the automatic surface unit, and inputs from temperature sensing means 26 which senses the temperature of the utensil being heated by element 12.

Figure 2:
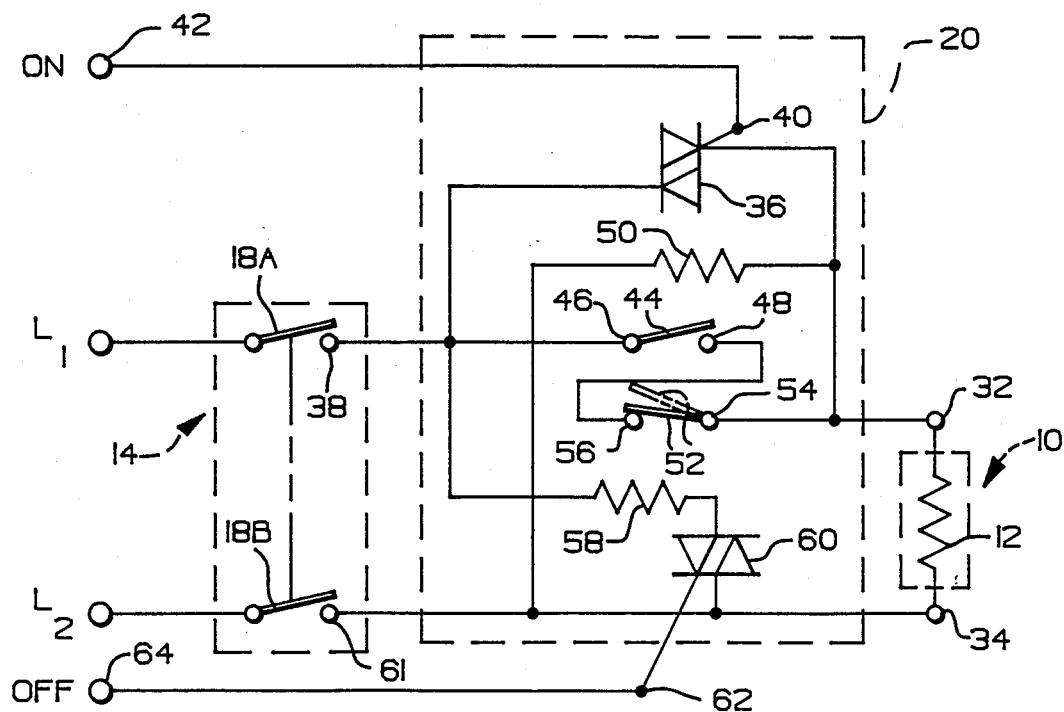
FIG. 2 is a simplified schematic diagram of the main power control switching circuitry portion of the circuit of FIG. 1 illustratively embodying the power control switching arrangement of the present invention.

FIG. 2 is a schematic diagram showing circuit details of power switch means 20 illustratively embodying the switching arrangement of the present invention. First and second input power terminals L1 and L2 are adapted for electrical connection to the 60 Hz AC 120 volt/240 volt domestic power supply. In the illustrative embodiment of FIG. 2, the load to be controlled is the heating element 12 for cooktop automatic surface unit 10. Element 12 is connected across first and second output terminals 32 and 34. First cam actuated switch contacts 18A of the manually operable main power ON/OFF switch means 14 is connected on one side to input power terminal L1. Second cam actuated switch contacts 18B are connected on one side to input power terminal L2. A first semiconductor switch means in the form of triac 36 electrically connects the other side 38 of cam actuated switch contacts 18A to output terminal 32. Gate terminal 40 for triac 36 is electrically connected to ON control terminal 42 to receive trigger signals from external controller 22 (FIG. 1).

A first thermally actuated switch means comprising bimetal switch member 44 is connected at one side 46 to terminal 38 of power switch means 14. Bimetal member 44 is operative when heated to move from its normally open position, shown in FIG. 2, to a closed position electrically connecting contacts 46 and 48.

A second thermally actuated switch means comprising a second bimetal switch member 52 is electrically connected at one side 54 to output power terminal 32. Bimetal member 52 is operative when heated to move from its normally closed position as shown electrically connecting terminals 54 and 56, to an open position (shown in phantom). Bimetal members 44 and 52 are arranged in parallel circuit with power control triac member 36. When both bimetal members are in the closed position power control triac 36 is effectively shunted.

A first heater means in the form of resistance heating element 50 is electrically connected across the output terminals 32 and 34 in parallel circuit with load element 12. Resistance heater 50 is positioned to be operative when energized to heat bimetal member 44. A second heater means in the form of resistance heating element 58 is connected in series with a second semiconductor switch means comprising triac 60. This series combination is connected between terminal 38 of power switch means 14 and output terminal 34. Resistor 58 is positioned to be operative when energized to heat bimetal member 52. Gate terminal 62 of triac 60 is connected to OFF control terminal 64. Energization of resistor 58 is controlled by triac 60 in response to trigger signals applied to terminal 64.

The circuit of FIG. 2 operates as follows: to turn on the surface unit power circuit, the user rotates control knob 16 (FIG. 1) to its ON position thereby closing main ON/OFF switch terminals 18A and 18B. With the ON/OFF switch in its ON position, the power to surface unit 10 is controlled by power control circuitry 20 in response to trigger signals applied to terminals 42 and 64 from controller 22. Such signals may be generated to control the temperature of the unit or to implement a predetermined duty cycle, depending on the control algorithms incorporated in the controller.

To initiate a conductive period for the heating element a trigger signal from controller 22 is applied to ON terminal 42 switching power control triac 36 into conduction. With triac 36 conducting, current flows through the triac to energize heating element 12. Current also flows through heater 50 in parallel with the heating element 12. Energization of heater 50 heats bimetal switch member 44, causing it to move from its normally open state or position to its closed state or position. After sufficient time has been allowed for the switching of bimetal member 50 the ON signal is removed from triac 36. With bimetal members 44 and 52 each in its closed position, triac 36 is shunted and current is supplied to the load through the bimetal switches. To de-energize load 12, a trigger signal from controller 22 is applied to terminal 64 to switch triac 60 into conduction. With triac 60 in conduction, resistance heater 58 is energized thereby heating bimetal member 52, causing it to move from its normally closed position to an open position. As bimetal member 52 moves from its closed position current to load 12 is interrupted. Current to heating means 50 for bimetal member 44 is also interrupted. As bimetal member 44 cools it returns to its normally open position. The trigger signal applied to gate terminal 62 of triac 60 must remain long enough to allow bimetal 44 to cool sufficiently to resume its normally open position before bimetal member 52 resumes its normally closed position. Removal of this trigger signal de-energizes heating resistor 58 and enables bimetal member 52 to cool. After sufficient cooling, bimetal member 52 will return to its normally closed position. The circuit is then ready for the next ON cycle.

While the sequence of operation just described works, there is a possibility of arcing across the contacts for bimetal switch means 52 when it opens to interrupt energization of the load. To protect against such arcing, power switching triac 36 may also be switched into conduction as part of the turn off sequence, prior to the movement of bimetal switch member 52 to its open position, providing a current path from the supply to the load around the about to open switch member 52. This current path through triac 36 prevents the build-up of sufficient voltage across the terminals to support arcing.

A switching sequence for implementation of a 50% duty cycle is illustrated in the state diagram of FIG. 3. The signal designated trigger A in FIG. 3 corresponds to the signal from controller 22 applied to ON control terminal 42 of FIG. 2. The signal designated trigger B refers to the trigger signal applied to OFF control terminal 64 of FIG. 1. The curve designated switch A represents the state of bimetal switch member 44 of FIG. 2. The curve designated switch B refers to the state of bimetal switch member 52. The curve designated Power To Load represents in an ON/OFF sense whether surface unit heating element 12 is energized or not. In the illustrative embodiment the bimetal members require approximately 5 seconds of heating for actuation. A cooling period of comparable duration is required for the switch members to resume de-actuated states. The duration of each of the trigger signals is selected to be approximately 7 seconds to allow sufficient heating to assure closure of the switch member before removal of the signal.

Referring now to FIG. 3, to turn the unit on at time zero the controller switches trigger A to its logical one state enabling energization of both load 12 and heater means 50. At approximately the 5 second mark, switch A switches from its open to its closed state after which triac 36 is effectively shunted. However, trigger signal A remains ON until the 7 second mark to allow ample closure time for member 44. At the 20 second mark the controller generates trigger signal B to de-energize load 12. Simultaneously a trigger signal is also applied to terminal 42 to switch triac 36 into conduction to provide an alternate current path to the load to prevent arcing as bimetal member 52 moves to its open position. Approximately 5 seconds after application of trigger signal B, bimetal switch 52 moves from its normally closed position to its open position. Upon removal of trigger signal B, switch B begins to cool and after about 5 seconds following removal of the trigger signal it will have cooled sufficiently to return to its normally closed state. Care must be exercised to insure that bimetal member 44 is permitted to cool sufficiently to return to its open position before bimetal member 52 returns to its closed position. Should switch member 44 fail to open before bimetal switch 52 closes, heater 50 for heating bimetal member 44 will again be energized and switch member 44 will begin to heat up without opening.

The circuit arrangement illustrated in FIG. 1 uses bimetal members assembled from bimetal strips commercially available from Robertshaw designated by Model Serial No. 8520C. The resistive heating elements are resistors having a resistance rating 10K and power rating of 240 V. These components are suitable to demonstrate the operability of the inventive concept. It is believed that in such an arrangement minimum ON times and OFF times on the order of 5 seconds are required to allow adequate actuation time for the switches to respond to the heaters and cooling time to return to their non-energized states. However, through appropriate refinement of the bimetal elements used and with the addition of biasing means such as perhaps a magnetic biasing member to enhance the switching speed, reaction times can be substantially reduced. Reaction times of 3 seconds or less are believed achievable.

In any event, the circuit arrangement in the illustrative embodiment eliminates the need for a large and bulky heat sink for the power control triac since ON time for the triac need only be on the order of a few seconds, which is not sufficient to cause sufficient heat build-up in the triacs to require a large hea sink. The packaging space required for the bimetal members is less than that typical of a comparably priced relay device. The cycle life of such bimetal members is believed to be on the order of 4–5 million cycles, which is approximately 4–5 times that of a comparably priced relay switching device. Finally, operation of the bimetal members is substantially quieter than relay switching devices of comparable cost.

While a specific embodiment of the invention has been illustrated and described herein, it is realized that numerous modifications and changes may occur to those skilled in the art. It is therefore to be understood that the appended claims are intended to cover all such modifications and changes which fall within the true spirit and scope of the invention.

What is claimed is:

1. A power control switching arrangement for selectively coupling a power signal from an external power supply to an electrical load in response to trigger signals from an external controller, said arrangement comprising:

a first semiconductor switch means for coupling the power signal from the external power supply to the load, having a gate terminal, and being switched into conduction by a trigger signal at its gate terminal from the external controller;

a first thermally actuated switch means operative to switch when heated from a normally open state to a closed state;

a second thermally actuated switch means operative to switch when heated from a normally closed state to an open state;

said first and second thermally actuated switch means being electrically connected in parallel circuit with said first semiconductor switch means to shunt said first semiconductor switch member when both therally actuated switch means are in said closed states;

first heater means arranged for electrical connection in parallel circuit with the load operative when energized to heat said first thermally actuated switch means;

second heater means electrically connected in series circuit with a second semiconductor switch means, arranged for electrical connection across the power supply, operative when energized to heat said second thermally actuated switch means, said second semiconductor switch means having a gate terminal and being switched into conduction by a trigger signal from the controller applied to its gate terminal;

whereby a trigger signal at the gate of said first semiconductor switch means enables energization of the load and said first heater means, causing said first thermally actuated switch means to switch to its closed state thereby shunting said first semiconductor switch means, and a trigger signal applied to the gate terminal of said second semiconductor switch means enables energization of said second heater means causing said second thermally actuated switch means to switch to its open state thereby de-energizing the load, and de-energizing said first heater means to enable said first thermally actuated switch means to return to its normally open state.

2. A power control switching arrangement for selectively coupling a power signal from an external power supply to an electrical load in response to trigger signals from an external controller, said arrangement comprising:

a first semiconductor switch means for coupling the power signal from the external power supply to the load, having a gate terminal, and being switched into conduction by a trigger signal at its gate terminal from the external controller;

a first bimetal switch member operative to move when heated from a normally open position to a closed position;

a second bimetal switch member operative to move when heated from a normally closed position to an open position;

said first and second bimetal members being electrically connected in parallel circuit with said first semiconductor switch means to shunt said first semiconductor switch member when both bimetal members are in said closed positions;

first heater means arranged for electical connection electrically connected in parallel circuit with the load operative when energized to heat said first bimetal member;

second heater means electrically connected in series circuit with a second semiconductor switch means, and arranged for electrical connection across the power supply, operative when energized to heat said second bimetal member, said second semiconductor switch means having a gate terminal and being switched into conduction by a trigger signal from the controller applied to its gate terminal;

whereby a trigger signal at the gate of said first semiconductor switch means enables energization of the load and said first heater means, causing said first bimetal member to move to its closed position thereby shunting said first semiconductor switch means, and a trigger signal applied to the gate terminal of said second semiconductor switch means enables energization of said second heater means causing said second bimetal member to move to its open position thereby de-energizing the load, and de-energizing said first heater means to enable said first bimetal element to return to its normally open position.

3. A power control switching arrangement for selectively coupling a power signal from an external power supply to an electrical load in response to ON and OFF signals from an external controller, said arrangement comprising:

first and second input power terminals for electrical connection to the external power supply;

first and second output terminals for electrical connection across the load to be controlled;

a pair of control terminals comprising an ON terminal and an OFF terminal for receiving ON and OFF control signals respectively from the external controller;

manually operable main power ON/OFF switch means electrically connected at one side to said first power input terminal;

a first power control triac electrically connecting the other side of said power switch means to said first output terminal, said first triac including a gate terminal electrically connected to said ON control terminal;

a first bimetal switch member electrically connected at one side to the other side of said power switch, said first bimetal member being operative when heated to move from a normally open position to a closed position;

a second bimetal switch member electrically connected at one side to said first output power terminal, said second bimetal member being operative when heated to move from a normally closed position to an open position;

said first and second bimetal members being positioned to electrically connect said other side of said power switch means directly to said first power output terminal, thereby shunting said first semiconductor switch means when each bimetal member is in its closed position;

first heater means electrically connected across said first and second power output terminals operative when energized to heat said first bimetal member;

second heater means electrically conected in series with a second power control triac between said other side of said power switch means and said second output terminal, operative when energized to heat said second bimetal member;

said second triac having a gate terminal electrically connected to said OFF input terminal;

whereby when said power switch is actuated, an ON signal from the external controller enables energization of said first heater means causing said first bimetal member to move to its closed position effectively shunting said first triac until an OFF signal enables energization of said second heater means causing said second bimetal member to move to its open position thereby de-energizing the load and de-energizing said first heater means, enabling said first bimetal member to return to its normally open position where it remains until the next ON signal from the controller.

4. The power control switching arrangement of claim 3 wherein said manually operable main power ON/OFF switch means comprises a user actuable control knob movable between an OFF and an ON position; cam means mechanically coupled to said control knob for movement in concert therewith and first and second cam actuated switches actuated in tandem in response to movement of said control knob to its ON position; one side of said first cam actuated switch means being connected to said first input power terminal and the other side connected to said first semiconductor switch means, one side of said second cam actuated switch means being connected to said second input power terminal and the other side being connected to said second output terminal.

* * * * *

UNITED STATES PATENT AND TRADEMARK OFFICE
CERTIFICATE OF CORRECTION

PATENT NO.   : 4,788,415

DATED        : November 29, 1988

INVENTOR(S)  : Robert Z. Whipple, Jr.

It is certified that error appears in the above-identified patent and that said Letters Patent is hereby corrected as shown below:

Claim 2, line 41, delete "electrically connected".

Signed and Sealed this

Twenty-fifth Day of April, 1989

Attest:

DONALD J. QUIGG

Attesting Officer

Commissioner of Patents and Trademarks